US012570827B2

(12) United States Patent
Kenchaiah et al.

(10) Patent No.: US 12,570,827 B2
(45) Date of Patent: Mar. 10, 2026

(54) SUSTAINABLE POLYESTER FROM RECYCLED POLYETHYLENE TEREPHTHALATE

(71) Applicant: SHPP GLOBAL TECHNOLOGIES B.V., Bergen op Zoom (NL)

(72) Inventors: Lohith Kenchaiah, Bangalore (IN); Peter Vollenberg, Mt. Vernon, IN (US); Kaushal Gandhi, Mt. Vernon, IN (US); Ranjith Choorikkat, Bangalore (IN); Vinod KN, Bangalore (IN)

(73) Assignee: SHPP Global Technologies B.V., Bergen op Zoom (NL)

( * ) Notice: Subject to any disclaimer, the term of this patent is extended or adjusted under 35 U.S.C. 154(b) by 639 days.

(21) Appl. No.: 17/924,487

(22) PCT Filed: May 11, 2021

(86) PCT No.: PCT/IB2021/054023

§ 371 (c)(1),
(2) Date: Nov. 10, 2022

(87) PCT Pub. No.: WO2021/229449

PCT Pub. Date: Nov. 18, 2021

(65) Prior Publication Data

US 2023/0174738 A1 Jun. 8, 2023

(30) Foreign Application Priority Data

May 11, 2020 (EP) .................................... 20173966

(51) Int. Cl.

| | |
|---|---|
| ***C08J 11/24*** | (2006.01) |
| ***C08G 63/183*** | (2006.01) |
| ***C08G 63/19*** | (2006.01) |
| ***C08G 63/199*** | (2006.01) |
| ***C08G 63/83*** | (2006.01) |
| ***C08G 63/84*** | (2006.01) |
| ***C08L 67/02*** | (2006.01) |

(52) U.S. Cl.

CPC ............. *C08J 11/24* (2013.01); *C08G 63/183* (2013.01); *C08G 63/19* (2013.01); *C08G 63/199* (2013.01); *C08G 63/83* (2013.01); *C08G 63/84* (2013.01); *C08L 67/02* (2013.01); *C08J 2367/02* (2013.01); *C08L 2207/20* (2013.01)

(58) Field of Classification Search

CPC .... C08J 11/10; C08J 11/14–28; C08J 2367/02
See application file for complete search history.

(56) References Cited

U.S. PATENT DOCUMENTS

| | | | | |
|---|---|---|---|---|
| 2,967,854 A * | 1/1961 | Bungs | .................. | C08G 63/672 568/660 |
| 9,127,136 B1 | 9/2015 | Bell et al. | | |
| 2002/0006518 A1* | 1/2002 | Lustig | .................... | B65D 65/42 428/480 |
| 2010/0168328 A1 | 7/2010 | Kannan | | |
| 2017/0349613 A1 | 12/2017 | Cantat et al. | | |

FOREIGN PATENT DOCUMENTS

| | | | | | |
|---|---|---|---|---|---|
| BE | 722 363 | A | | 3/1969 | |
| CA | 2298551 | C | | 12/2003 | |
| CN | 103467724 | A | | 12/2003 | |
| CN | 1639225 | A | | 7/2005 | |
| CN | 103588962 | A | | 2/2014 | |
| CN | 104003840 | A | * | 8/2014 | ........... C07C 67/303 |
| CN | 105294393 | A | * | 2/2016 | ........... C07C 29/149 |

(Continued)

OTHER PUBLICATIONS

Machine Translation of CN104003840A. Aug. 27, 2014. (Year: 2014).*

East, A. J. Thermoplastic Polyesters. Encyclopedia of Polymer Science and Technology. John Wiley & Sons, Inc. 2002. (Year: 2002).*

Machine Translation of JP2020-007542A. Jan. 16, 2020. (Year: 2020).*

(Continued)

*Primary Examiner* — Stephen E Rieth
(74) *Attorney, Agent, or Firm* — Quicker Law, LLC

(57) ABSTRACT

A method includes depolymerizing post-consumer or post-industrial recycled polyethylene terephthalate (rPET) to form bis(2-hydroxyethyl) terephthalate (BHET), and reacting at least a portion of the BHET with a catalyst to form an alcohol. The alcohol includes cyclohexanedimethanol (CHDM) or 1,4-phenylenedimethanol (PDM). Further steps of the method include polymerizing the alcohol in the presence of additional BHET to form a polyester. The polyester may include poly(cyclohexylenedimethylene terephthalate (PCT), polyethylene terephthalate glycol (PETG) copolyester, polycyclohexylene dimethylene terephthalate glycol (PCTG) copolyester, polycyclohexylene dimethylene terephthalate acid (PCTA), or a monomer having repeating units with the structure (I), wherein n is an integer having a value of at least 20.

Formula I

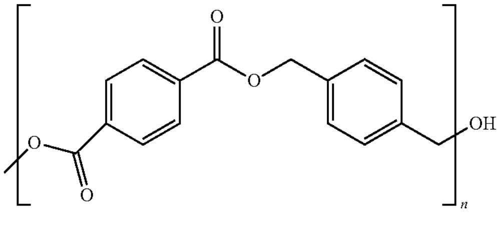

,

2 Claims, 2 Drawing Sheets

(56) References Cited

FOREIGN PATENT DOCUMENTS

| | | | | |
|---|---|---|---|---|
| CN | 107417526 | A | | 12/2017 |
| DE | 1803930 | A1 | | 5/1969 |
| EP | 1576039 | A2 | | 9/2005 |
| JP | 2004-300130 | A | | 10/2004 |
| JP | 2020007542 | A | * | 1/2020 |
| WO | 2015/065722 | A1 | | 5/2015 |

OTHER PUBLICATIONS

Machine Translation of CN105294393. Feb. 3, 2016 (Year: 2016).*

Clark et al. Catalysts, Supported. Kirk-Othmer Encyclopedia of Chemical Technology. John Wiley & Sons, Inc. 2011 (Year: 2011).*

Krall et al. Controlled hydrogenative depolymerization of polyesters and polycarbonates catalyzed by ruthenium(II) PNN pincer complexes. Chem. Commun. 2014, 50, 4884. (Year: 2014).*

Sakamuri, R. "Esters, Organic". In Kirk-Othmer Encyclopedia of Chemical Technology, John Wiley & Sons, Inc., 2003, pp. 497-526.

Higashi, F. et al. "Direct Polycondensation of Aromatic Dicarboxylic Acids and Bisphenols with Tosyl Chloride and N, N-Dimethyformamide in Pyridine". Journal of Polymer Science: Polymer Chemistry Edition, vol. 22, 1984, pp. 1653-1660.

International Search Report and Written Opinion dated Aug. 16, 2021 in PCT/IB2021/054023 (13 pgs.).

Kibler, C. et al. "Polyesters of 1,4-Cyclohexanedimethanol". Journal of Polymer Science: Part A, vol. 2, 1964, pp. 2115-2125.

Turner, S. R. et al. "Cyclohexanedimethanol Polyesters". In Encyclopedia of Polymer Science and Technology, John Wiley & Sons, Inc., 2001, pp. 127-134.

Park, S. et al. "Synthesis and Properties of Copolyesters Derived from 1,4-Cyclohexanedimethanol, Terephthalic Acid, and 2,6-Napthalenedicarboxylic Acid with Enhanced Thermal and Barrier Properties". Polymer(Korea), vol. 42, No. 4, 2018, pp. 662-669.

Heo, Y.M. et al. "Synthesis and charateristics of biobased copolyester for thermal shrinkage film." RSC Advances, vol. 6, 2016, pp. 57626-57633.

* cited by examiner

SUSTAINABLE POLYESTER FROM RECYCLED POLYETHYLENE TEREPHTHALATE

CROSS-REFERENCE TO RELATED APPLICATION

This application is the National Stage of International Application No. PCT/IB2021/054023 filed May 11, 2021, which claims priority to and the benefit of European Application No. 20173966.1 filed May 11, 2020, the disclosures of which are incorporated herein by this reference in their entireties.

FIELD OF THE DISCLOSURE

The present disclosure relates to methods of making polyesters from post-consumer or post-industrial recycled polyethylene terephthalate, and in particular thermoplastic compositions including polybutylene terephthalate derived from post-consumer or post-industrial recycled polyethylene terephthalate.

BACKGROUND OF THE DISCLOSURE

An injection molding material must satisfy many requirements to be suitable for consumer centric applications such as personal electronics. In certain applications, the material must be producible in a bright white color. Color is typically not a problem for petrochemical-based injection molded products (commonly referred to as "virgin" materials), but it can be difficult to achieve certain colors when the injection molded material includes post-consumer or post-industrial recycled (PCR) components, such as those derived from waste polyethylene terephthalate (PET). This presents a particular challenge with consumer electronics markets (among others) looking to incorporate "sustainable materials" in the products.

Thermoplastic compositions including from about 5 to 50 wt % post-consumer or post-industrial materials and that have suitable physical performance have been developed. In general, this allows materials to be obtained that have adequate physical performance with up to about 80% recycled carbon. However, residual colorants or other contaminants in the PCR materials prevent these compositions from having certain colors, and in particular a bright white color.

These and other shortcomings are addressed by aspects of the disclosure.

SUMMARY

Aspects of the disclosure relate to a method including depolymerizing post-consumer or post-industrial recycled polyethylene terephthalate (rPET) to form bis(2-hydroxyethyl) terephthalate (BHET), and reacting at least a portion of the BHET with a catalyst to form an alcohol. The alcohol includes cyclohexanedimethanol (CHDM) or 1,4-phenylenedimethanol (PDM).

Aspects of the disclosure further relate to a method including polymerizing the alcohol (CHDM or PDM) in the presence of additional BHET to form a polyester. The polyester may include poly(cyclohexylenedimethylene terephthalate (PCT), polyethylene terephthalate glycol (PETG) copolyester, polycyclohexylene dimethylene terephthalate glycol (PCTG) copolyester, polycyclohexylene dimethylene terephthalate acid (PCTA), or a monomer having repeating units with the structure

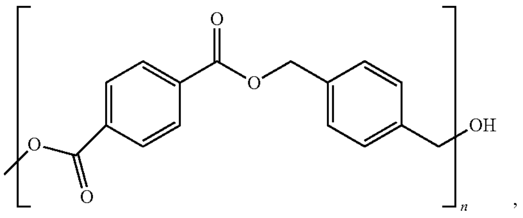

wherein n is an integer having a value of at least 20.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
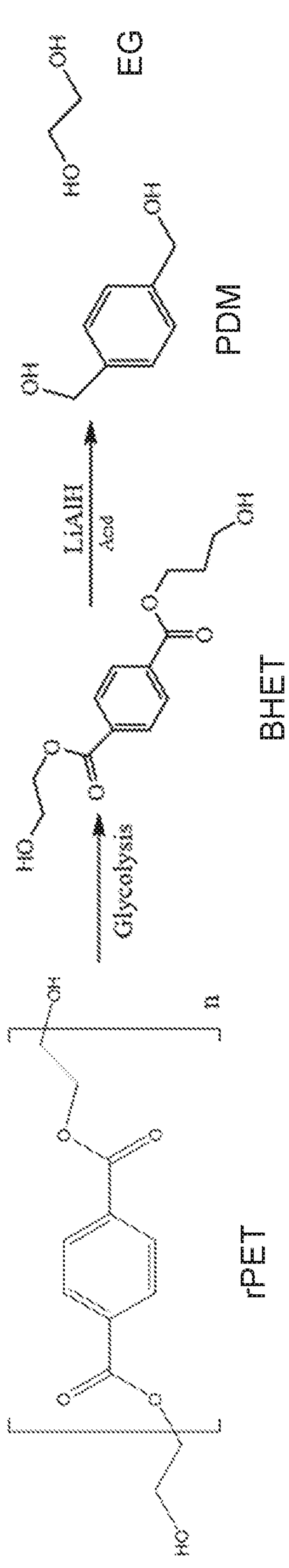
FIG. 1 is an exemplary reaction scheme for making PDM from post-consumer or post-industrial recycled polyethylene terephthalate (rPET) according to an aspect of the disclosure.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the embodiments "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to a composition including "a filler" includes compositions having two or more fillers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, "polyethylene terephthalate" (PET) can be used interchangeably with poly(ethyl benzene-1,4-dicarboxylate). PET is a type of polyester and has a structure represented by the formula:

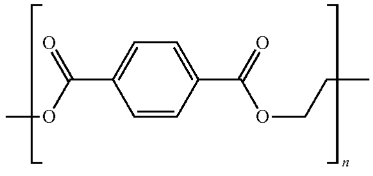

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Methods for Forming Alcohols and Polyesters from rPET

In this disclosure, post-consumer or post-industrial recycle based components are specifically meant to be "up-cycled" polybutylene terephthalate (PBT) polymers. The term "up-cycled" constitutes the process where post-consumer or post-industrial recycle polyethylene terephthalate (rPET) is chemically brought back to monomers, like the terephthalate containing monomer bis(2-hydroxyethyl) terephthalate (BHET) and ethylene glycol (EG). Subsequently, BHET is polymerized with butanediol (BDO) to create PBT. Within SABIC this is known as the "iQ process". A number of process and product patents have been granted to SABIC on this technology.

In terms of performance features iQ-based compositions have been demonstrated to satisfy physical performance criteria. However, they have not been able to result in 100% sustainable products. The current disclosure relates to iQ-type polyester-based compositions having a sustainable content higher than what can be achieved in the current iQ process without using an externally sourced bio-based BDO.

Aspects of the disclosure thus relate to a method including:

a. depolymerizing post-consumer or post-industrial recycled polyethylene terephthalate (rPET) to form bis(2-hydroxyethyl) terephthalate (BHET); and b. reacting at least a portion of the BHET with a catalyst to form an alcohol, wherein the alcohol comprises cyclohexanedimethanol (CHDM) or 1,4-phenylenedimethanol (PDM).

In some aspects the catalyst that is reacted with the BHET includes lithium aluminum hydride ($LiAlH_4$), Ru/C or Pd/C.

In further aspects the catalyst that is reacted with the BHET includes $LiAlH_4$ and the alcohol includes PDM. An exemplary reaction scheme for making PDM from rPET is illustrated in FIG. 1. Residual ethylene glycol (EG) may be formed with the PDM from the hydrogenation of BHET with the catalyst.

Figure 2:
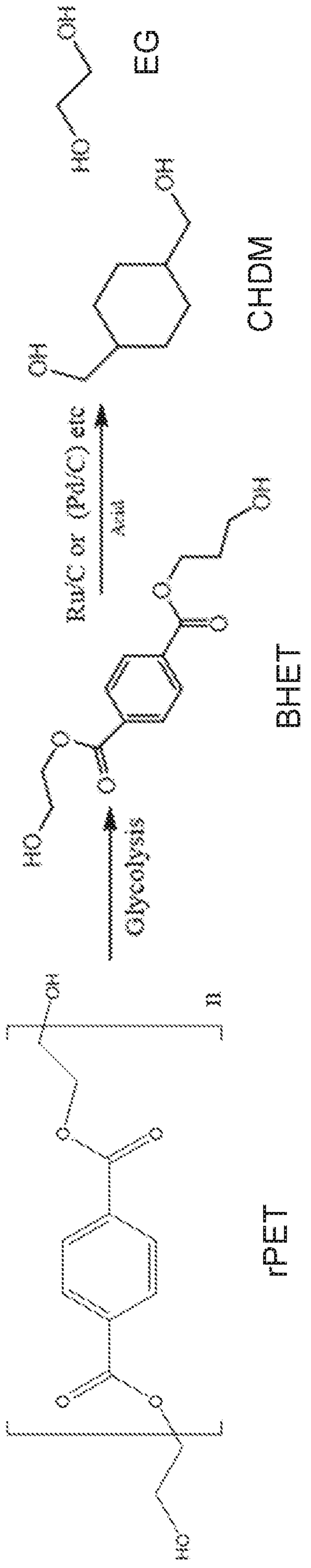
FIG. 2 is an exemplary reaction scheme for making CHDM from post-consumer or post-industrial recycled polyethylene terephthalate (rPET) according to an aspect of the disclosure.

In yet further aspects the catalyst that is reacted with the BHET includes Ru/C or Pd/C and the alcohol includes CHDM. An exemplary reaction scheme for making CHDM from rPET is illustrated in FIG. 2. Residual ethylene glycol (EG) may be formed with the PDM from the hydrogenation of BHET with the catalyst. In some aspects hydrogenation of the BHET is carried out at a temperature of about 493 Kelvin (K).

The method may further include in some aspects the step of polymerizing the alcohol in the presence of additional BHET to form a polyester. The additional BHET may be sourced from virgin polymer, recycled polymer or a combination thereof.

In a particular aspect the alcohol includes PDM, and the polyester includes a monomer having repeating units with the structure

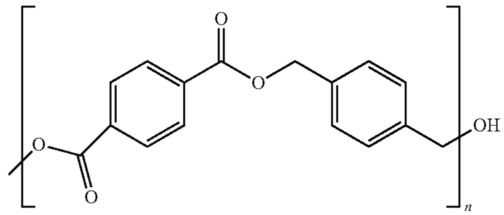

Figure 3:
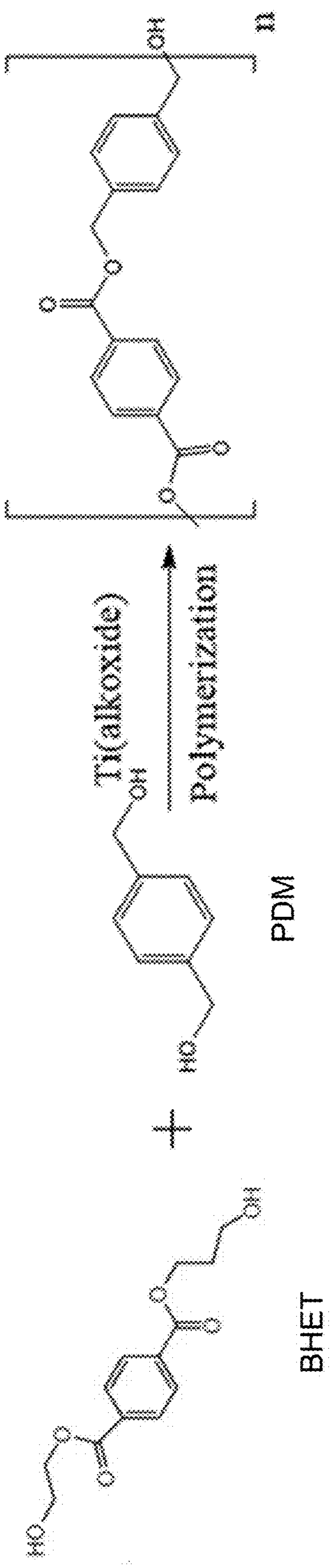
FIG. 3 is an exemplary reaction scheme for making a polyester from PDM formed according to an aspect of the disclosure.

, wherein n is an integer having a value of at least 20. In some aspects n has a value of at least 25, or a value of at least 30. In particular aspects n has a value of from 20 to 200, or from 20 to 125, or from 20 to 100, or from 25 to 200, or from 25 to 125, or from 25 to 100, or from 30 to 200, or from 30 to 125, or from 30 to 100. An exemplary reaction scheme for making this polyester from PDM is illustrated in FIG. 3.

Figure 4:
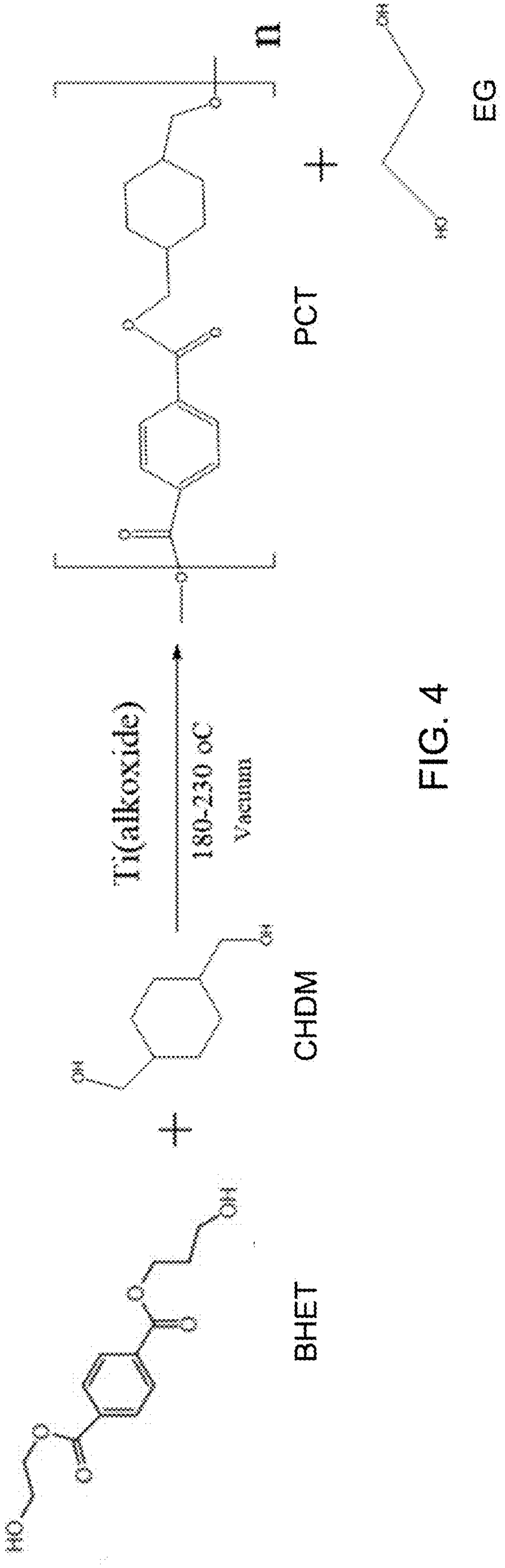
FIG. 4 is an exemplary reaction scheme for making a PCT polyester from CHDM formed according to an aspect of the disclosure.

In other aspects the alcohol includes CHDM, and the polyester includes poly(cyclohexylenedimethylene terephthalate (PCT). An exemplary reaction scheme for making PCT from CHDM is illustrated in FIG. 4.

In further aspects the alcohol includes CHDM, and the polyester is a polyethylene terephthalate glycol (PETG) copolyester. In certain aspects the alcohol includes CHDM, and the polyester is a polycyclohexylene dimethylene terephthalate glycol (PCTG) copolyester. Formation of either PETG or PCTG copolyester from CHDM can be controlled by including ethylene glycol (EG) in the polymerization reaction. PETG is formed if less than 50% of the diol content in the copolyester is CHDM; PCTG is formed if greater than 50% of the diol content in the copolyester is CHDM. In yet further aspects the alcohol includes CHDM, and the CHDM is polymerized in the presence of additional BHET and isophthalic acid to form a polyester including polycyclohexylene dimethylene terephthalate acid (PCTA).

In some aspects the polyester includes at least 50 wt % carbon derived from rPET. In further aspects the polyester includes at least 80 wt % carbon derived from rPET.

Polyesters

Aspects of the disclosure further relate to a polyester including a monomer having repeating units with the structure

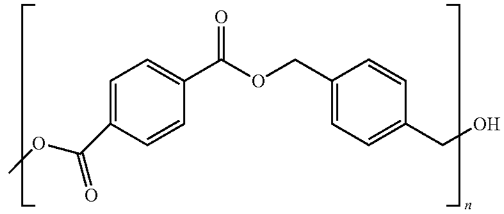

, wherein n is an integer having a value of at least 20. In some aspects n has a value of at least 25, or a value of at least 30. In particular aspects n has a value of from 20 to 200, or from 20 to 125, or from 20 to 100, or from 25 to 200, or from 25 to 125, or from 25 to 100, or from 30 to 200, or from 30 to 125, or from 30 to 100.

In some aspects the polyester includes at least 50 wt % carbon derived from post-consumer or post-industrial recycled polyethylene terephthalate (rPET) content. In further aspects the polyester includes at least 80 wt % carbon derived from rPET content.

Articles of Manufacture

In certain aspects, the present disclosure pertains to shaped, formed, or molded articles including the polyesters described herein. Thermoplastic compositions including the polyesters described herein can be molded into useful shaped articles by a variety of means such as injection molding, extrusion, rotational molding, blow molding and thermoforming to form articles, structural components or functional components of, for example, personal or commercial electronics devices, including but not limited to cellular telephones, tablet computers, personal computers, notebook and portable computers, and other such equipment, medical applications, RFID applications, automotive applications, and the like.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A method comprising, consisting of, or consisting essentially of:

a. depolymerizing post-consumer or post-industrial recycled polyethylene terephthalate (rPET) to form bis(2-hydroxyethyl) terephthalate (BHET); and b. reacting at least a portion of the BHET with a catalyst to form an alcohol, wherein the alcohol comprises cyclohexanedimethanol (CHDM) or 1,4-phenylenedimethanol (PDM).

Aspect 2. The method according to Aspect 1, wherein the catalyst comprises lithium aluminum hydride ($LiAlH_4$), Ru/C or Pd/C.

Aspect 3. The method according to Aspect 1 or 2, wherein the catalyst comprises $LiAlH_4$ and the alcohol comprises PDM.

Aspect 4. The method according to Aspect 1 or 2, wherein the catalyst comprises Ru/C or Pd/C and the alcohol comprises CHDM.

Aspect 5. The method according to any of Aspects 1 to 4, further comprising the step of polymerizing the alcohol in the presence of additional BHET to form a polyester.

Aspect 6. The method according to Aspect 5, wherein the alcohol comprises PDM, and the polyester comprises a monomer having repeating units with the structure

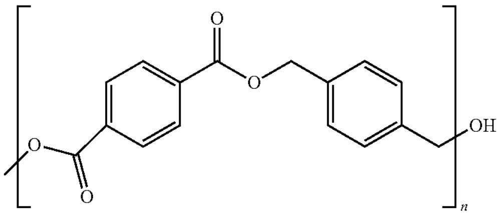

, wherein n is an integer having a value of at least 20.

Aspect 7. The method according to Aspect 5, wherein the alcohol comprises CHDM, and the polyester comprises poly(cyclohexylenedimethylene terephthalate (PCT).

Aspect 8. The method according to Aspect 5, wherein the alcohol comprises CHDM, and the polyester is a polyethylene terephthalate glycol (PETG) copolyester.

Aspect 9. The method according to Aspect 5, wherein the alcohol comprises CHDM, and the polyester is a polycyclohexylene dimethylene terephthalate glycol (PCTG) copolyester.

Aspect 10. The method according to Aspect 5, wherein the alcohol comprises CHDM, and the CHDM is polymerized in the presence of additional BHET and isophthalic acid to form a polyester comprising polycyclohexylene dimethylene terephthalate acid (PCTA).

Aspect 11. The method according to any of Aspects 5 to 10, wherein the polyester comprises at least 50 wt % carbon derived from rPET, or in particular aspects at least 80 wt % carbon derived from rPET.

Aspect 12. A polyester comprising, consisting of, or consisting essentially of a monomer having repeating units with the structure

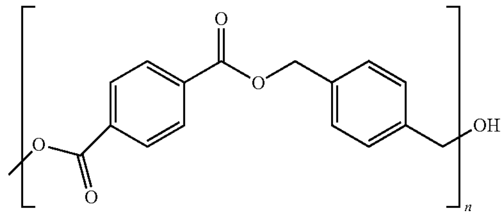

, wherein n is an integer having a value of at least 20.

Aspect 13. The polyester according to Aspect 12, wherein the polyester comprises at least 50 wt % carbon derived from post-consumer or post-industrial recycled polyethylene terephthalate (rPET) content, or in particular aspects at least 80 wt % carbon derived from rPET content.

Aspect 14. A method comprising, consisting of, or consisting essentially of:

a. depolymerizing post-consumer or post-industrial recycled polyethylene terephthalate (rPET) to form bis(2-hydroxyethyl) terephthalate (BHET); and b. reacting at least a portion of the BHET with a catalyst to form an alcohol; and c. polymerizing the alcohol in the presence of additional BHET to form a polyester, wherein the alcohol comprises cyclohexanedimethanol (CHDM) and the polyester comprises polyethylene terephthalate glycol (PETG) copolyester, polycyclohexylene dimethylene terephthalate glycol (PCTG) copolyester, or polycyclohexylene dimethylene terephthalate acid (PCTA), or the alcohol comprises 1,4-phenylenedimethanol (PDM) and the polyester comprises a monomer having repeating units with the structure

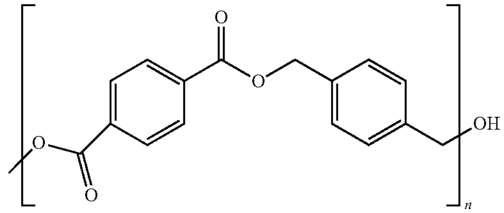

, wherein n is an integer having a value of at least 20.

Aspect 15. The method according to Aspect 14, wherein the catalyst comprises lithium aluminum hydride ($LiAlH_4$), Ru/C or Pd/C.

Aspect 16. The method according to Aspect 14 or 15, wherein the catalyst comprises $LiAlH_4$ and the alcohol comprises PDM.

Aspect 17. The method according to Aspect 14 or 15, wherein the catalyst comprises Ru/C or Pd/C and the alcohol comprises CHDM.

Aspect 18. The method according to any of Aspects 14 to 16, wherein the alcohol comprises PDM, and the polyester comprises a monomer having repeating units with the structure

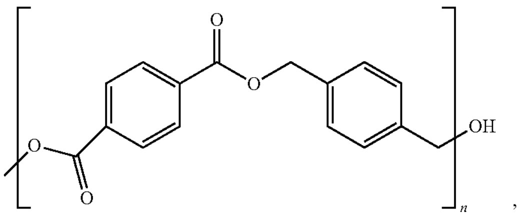

wherein n is an integer having a value of at least 20.

Aspect 19. The method according to any of Aspects 14, 15 or 17, wherein the alcohol comprises CHDM, and the polyester comprises poly(cyclohexylenedimethylene terephthalate (PCT).

Aspect 20. The method according to any of Aspects 14, 15 or 17, wherein the alcohol comprises CHDM, and the polyester is a polyethylene terephthalate glycol (PETG) copolyester.

Aspect 21. The method according to any of Aspects 14, 15 or 17, wherein the alcohol comprises CHDM, and the polyester is a polycyclohexylene dimethylene terephthalate glycol (PCTG) copolyester.

Aspect 22. The method according to any of Aspects 14, 15 or 17, wherein the alcohol comprises CHDM, and the CHDM is polymerized in the presence of additional BHET and isophthalic acid to form a polyester comprising polycyclohexylene dimethylene terephthalate acid (PCTA).

Aspect 23. The method according to any of Aspects 14 to 22, wherein the polyester comprises at least 80 wt % carbon derived from rPET.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method comprising:

a. depolymerizing post-consumer or post-industrial recycled polyethylene terephthalate (PET) to form bis (2-hydroxyethyl) terephthalate (BHET);

b. reacting at least a portion of the BHET with lithium aluminum hydride ($LiAlH_4$) to form 1,4-phenylenedimethanol (PDM); and c. polymerizing the PDM in the presence of additional BHET to form a polyester comprising a monomer having repeating units with the structure

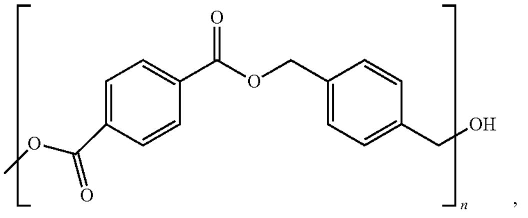

wherein n is an integer having a value of at least 20.

2. The method according to claim 1, wherein the polyester comprises at least 80 wt % carbon derived from the rPET.

* * * * *